US011619485B2

(12) United States Patent
Grauzinis et al.

(10) Patent No.: US 11,619,485 B2
(45) Date of Patent: *Apr. 4, 2023

(54) HYBRID 3D OPTICAL SCANNING SYSTEM

(71) Applicant: Vehicle Service Group, LLC, Madison, IN (US)

(72) Inventors: Aivaras Grauzinis, Schilde (BE); Geert Willems, Hechtel-Eksel (BE)

(73) Assignee: Vehicle Service Group, LLC, Madison, IN (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/166,376

(22) Filed: Feb. 3, 2021

(65) Prior Publication Data

US 2021/0156678 A1    May 27, 2021

Related U.S. Application Data

(63) Continuation of application No. 16/350,844, filed as application No. PCT/US2017/000043 on Jul. 27, 2017, now Pat. No. 10,921,118.

(Continued)

(51) Int. Cl.
*G01B 11/25* (2006.01)

(52) U.S. Cl.
CPC ...... *G01B 11/2513* (2013.01); *G01B 11/2518* (2013.01)

(58) Field of Classification Search
CPC ............. G01B 11/2513; G01B 11/245; G01B 11/2518; H04N 13/275; H04N 13/243;

(Continued)

(56) References Cited

U.S. PATENT DOCUMENTS

| 4,188,544 A * | 2/1980 | Chasson ............ G01B 11/2504 144/357 |
| 4,742,237 A | 5/1988 | Ozawa |

(Continued)

FOREIGN PATENT DOCUMENTS

| DE | 202013000050 | 2/2013 |
| DE | 102014224274 | 6/2016 |

(Continued)

OTHER PUBLICATIONS

Extended European Search Report in European Appln. No. 19743320.4, dated Nov. 24, 2020, 7 pages.

(Continued)

*Primary Examiner* — Isiaka O Akanbi
(74) *Attorney, Agent, or Firm* — Fish & Richardson P.C.

(57) ABSTRACT

Methods, devices, and systems for acquiring three-dimensional (3D) measurements of object surfaces are provided. In one aspect, an optical scanning system includes: a first digital illuminator configured to illuminate a sequence of first patterns along a first optical path directed upon an object surface, a second digital illuminator configured to illuminate at least one sequence of second patterns along a second optical path onto the object surface, and at least one digital camera disposed facing the object surface and configured to capture both images of the sequence of first patterns reflected from the object surface and images of the at least one sequence of second patterns reflected from the object surface to generate 3D reconstruction data of the object surface. The second optical path is different from the first optical path, and the at least one sequence of second patterns is different from the sequence of first patterns.

33 Claims, 11 Drawing Sheets

Related U.S. Application Data

(60) Provisional application No. 62/494,091, filed on Jul. 27, 2016.

(58) Field of Classification Search
CPC ........... G06T 7/579; G06T 7/62; G06T 7/292; G06T 7/536; G06T 1/0007; G06K 7/10732; G06K 9/2036
USPC .................................................. 356/610–624
See application file for complete search history.

(56) References Cited

U.S. PATENT DOCUMENTS

| | | | |
|---|---|---|---|
| 5,530,551 | A | 6/1996 | Cantrall et al. |
| 6,147,752 | A | 11/2000 | Hewitt et al. |
| 6,549,289 | B1 | 4/2003 | Ellis |
| 6,556,783 | B1 | 4/2003 | Gelphman |
| 7,532,333 | B2 | 5/2009 | Haeusler et al. |
| 7,616,300 | B2 | 11/2009 | Nohara et al. |
| 8,064,069 | B2 | 11/2011 | Wienand et al. |
| 8,243,289 | B2 * | 8/2012 | Lin .................... G01B 11/2545 250/559.22 |
| 10,880,538 | B2 | 12/2020 | Tausch et al. |
| 10,921,118 | B2 | 2/2021 | Grauzinis et al. |
| 2005/0238237 | A1 | 10/2005 | Haeusler et al. |
| 2005/0254378 | A1 | 11/2005 | Wagner et al. |
| 2006/0192979 | A1 | 8/2006 | Lammert et al. |
| 2007/0146728 | A1 | 6/2007 | Pristner |
| 2008/0137088 | A1 | 6/2008 | Wagner |
| 2008/0317334 | A1 | 12/2008 | Hausler |
| 2009/0271068 | A1 | 10/2009 | Shi et al. |
| 2010/0310130 | A1 | 12/2010 | Beghuin et al. |
| 2012/0300065 | A1 * | 11/2012 | Willemann ............ G02B 5/001 348/136 |
| 2013/0057678 | A1 | 3/2013 | Prior Carrillo et al. |
| 2014/0139717 | A1 * | 5/2014 | Short .................... H04N 9/3185 348/333.1 |
| 2015/0219500 | A1 * | 8/2015 | Maes .................... G01J 5/0896 353/33 |
| 2015/0324991 | A1 * | 11/2015 | Schmidt ............. G01B 11/2513 348/136 |
| 2017/0147990 | A1 | 5/2017 | Franke et al. |
| 2017/0148102 | A1 | 5/2017 | Franke et al. |
| 2019/0170507 | A1 | 6/2019 | Grauzinis et al. |
| 2021/0041371 | A1 | 2/2021 | Grauzinis et al. |
| 2021/0396684 | A1 | 12/2021 | Tissandier et al. |

FOREIGN PATENT DOCUMENTS

| | | |
|---|---|---|
| DE | 102016006780 | 12/2017 |
| WO | WO 2015169730 | 11/2015 |

OTHER PUBLICATIONS

Huang et al., "Dynamic three-dimensional sensing for specular surface with monoscopic fringe reflectometry", Optics Express, Jun. 20, 2011, 19(13):12809-12814.

Konolige, "Projected Texture Stereo", 2010 IEEE International Conference on Robotics and Automation, May 3-8, 2010, Anchorage, Alaska, USA, 148-155.

PCT International Preliminary Report on Patentability in International Appln. No. PCT/US2017/000003, dated Jul. 28, 2020, 6 pages.

PCT International Preliminary Report on Patentability in International Appln. No. PCT/US2017/000043, dated Jan. 29, 2019, 6 pages.

PCT International Search Report and Written Opinion in International Appln. No. PCT/US2017/000003, dated Apr. 19, 2019, 8 pages.

PCT International Search Report and Written Opinion in International Appln. No. PCT/US2017/000043, dated Feb. 1, 2018, 7 pages.

Ren et al., "Absolute height measurement of specular surfaces with modified active fringe reflection deflectometry", Conference Paper in Proceedings of SPIE The International Society for Optical Engineering, Aug. 2014, 9204:920408, 8 pages.

Rocchini et al., "A low cost 3D scanner based on structured light", Computer Graphics Forum, Nov. 2001, 20(3):299-308.

Zheng et al., "Structured Light Based 3D Reconstruction Using Gray Code and Line-Shift Stripes," Advanced Materials Research, May 11, 2010, 108-111(1):799-804.

* cited by examiner

HYBRID 3D OPTICAL SCANNING SYSTEM

CROSS-REFERENCE TO RELATED APPLICATIONS

This application is a continuation of and claims benefit of priority to U.S. patent application Ser. No. 16/350,844 filed Jan. 23, 2019, which is a U.S. National Phase Application under 35 U.S.C. § 371 of International Application No. PCT/US2017/000043 filed Jul. 27, 2017, which claims the benefit priority to U.S. Provisional Application Ser. No. 62/494,091 filed Jul. 27, 2016. The contents of the foregoing applications and International Application No. PCT/US2019/000003 filed Jan. 25, 2019, are hereby incorporated by reference in their entirety as if fully set forth herein.

BACKGROUND OF THE INVENTION

The present invention relates to metrology systems used to provide precise measurements of three-dimensional (3D) surfaces of articles under inspection and more particularly, to an improved hybrid measurement system using calibrated active stereo 3D reconstruction and uncalibrated nonplanar deflected or back-projection reflectometry to acquire and accurately measure both global shape and local fine deformations, dents and surface imperfections of specular, glossy and metallic surfaces of industrial, automotive and aerospace components and parts.

Measuring dents, deformations and other defects of articles under inspection, especially those of specular, glossy metallic surfaces of automotive, aerospace and other manufactured parts presents a problem due to reflective nature of those surfaces. Typical metrology systems in this field of article inspection rely on measuring contrast of projected patterns on those surfaces, but since most of these surfaces have both high curvature and high reflectivity, most of projected light is reflected away from camera, and produce very low contrast images of projected patterns. It is even more problematic when those above-described object surfaces are of dark colors and/or metallic paint type, where tiny metallic particles are suspended in a translucent coating. In such cases, there are three (3) defacto surfaces capable of reflecting projected light in very different and somewhat unpredictable ways, namely, the outer glossy and translucent layer, the suspended metallic particles, and the underlying color coat. Detection and resolution of all these differing reflections can be very complicated and prove to be compromising to the precision of the metrology system to the point where measurement errors becomes larger than the desired accuracy of measurement, especially in the areas of small defects, dents and scratches thereby making detection and reliable measurement of above mentioned articles either unreliable or impossible.

Prior art systems heretofore used in the detection and measurement of dents, deformations and scratches on specular, glossy and metallic surfaces have been either of the type employing active stereo or structured-light in order to scan and detect the object surfaces or have been systems employing deflectometry. 3D reconstruction systems can use a wide variety of methods including laser stripe projection, random pattern active stereo vision systems and structured-light digital pattern projection systems. All of these systems are suffering from above mentioned reflectivity issues and produce low contrast images and noisy measurement results. Laser based system suffers from disadvantage of requiring moving parts and long acquisition times to measure large parts or surfaces. Stereo vision based systems are especially sensitive to reflectivity variations and produce least reliable results. Multiple pattern digital projection active stereo 3D reconstruction systems produce better results, but still have large measurement errors in areas of above mentioned defects and therefore do not produce reliable enough results. Examples of these prior art active stereo 3D reconstruction systems for three-dimensional measurements are discussed and described in the following publications: C. Rocchini et al., "A low cost 3D scanner based on structured light", Computer Graphics Forum (Eurographics 2001 Conference Issue), 20(3): 299-308, 2001 and on the Internet at https://www.vs.inf.ethz.ch/edu/SS2005/DS/papers/projected/rocchini-3dscanner.pdf; Kurt Konolige, "Projected Texture Stereo", Willow Garage, Menlo Park, USA, published in Robotics and Automation (ICRA), 2010 IEEE International Conference on 3-7 May 2010; and Shun Yi Zheng et al., "Structured Light Based 3D Reconstruction Using Gray Code and Line-Shift Stripes", Advanced Materials Research (May 2010) 108-111:799-804. DOI: 10.4028/www.scientific.net/AMR.108-111.799.

Deflectometry systems work on different principles and exploit the reflectivity of the inspected object. Deflectometry typically uses a flat screen (LCD or similar) positioned towards the object in a way that a pattern displayed on the screen would be reflected by object to camera. This requires the screen to be few times larger than the intended measurement area and be completely flat to obtain good measurements. These requirements can pose serious limitations as the size of screens are limited and subject to tolerances on flatness and the spatial configuration of the deflectometry system often fails to be reasonable to measure large areas. Although deflectometry is capable of detecting local changes in curvature (such as dents and deformations) very well, due to ambiguities in the principle it is not capable of deriving absolute shape of the object with high accuracy, as this shape is extracted by assuming one can integrate the curvature information. Examples of prior art systems using reflectometry for 3D sensing and object measurements are discussed and described in the following publications: Lei Huang et al., "Dynamic three-dimensional sensing for specular surface with monoscopic fringe reflectometry", Optics Express 19(13):12809-14 (June 2011) DOI: 10.1364/OE.19.012809; Hongyu Rena et al., "Absolute height measurement of specular surfaces with modified active fringe reflection deflectometry", Conference Paper in Proceedings of SPIE The International Society for Optical Engineering 9204:920408 (August 2014) DOI: 10.1117/12.2060203.

While these separate system methodologies have been generally satisfactory, subject to their respective limitations, in collecting measureable data through optical scanning and detection from the surfaces of relatively smaller objects, those limitations described above have been found to be unreliable in obtaining highly accurate measurement data from larger object surfaces needed to produce high resolution images of the object surfaces. Furthermore, neither of the separate system methodologies have shown the independent capability to produce accurate measurements of small deformations, dents and scratches on specular, glossy and metallic object surfaces of various sizes.

Therefore, a need exists for an improved optical scanning system for providing 3D surface measurements of objects of varying size and dimension that are more accurate and reliable in their measure than heretofore provided by the prior art systems and further capable of acquiring and measuring both global shape and local fine deformations, dents and surface imperfections of specular, glossy and metallic surfaces of various industrial, automotive and aerospace components and parts.

SUMMARY OF THE INVENTION

Accordingly, it is a general purpose and object of the present invention to provide an improved optical scanning system for providing 3D surface measurements of objects of varying size and dimension that are more accurate and reliable in their measure than heretofore provided by the prior art systems.

A more particular object of the present invention is to provide an improved 3D surface measurement system capable of accurately measuring the surfaces of objects large and small and particularly capable of acquiring and measuring both global shape and local fine deformations, dents and surface imperfections of specular, glossy and metallic surfaces of various industrial, automotive and aerospace components and parts.

A still more particular object of the present invention is to provide an improved 3D surface measurement system capable of detecting and measuring both circular and semi-circular dents across large nonplanar surfaces as well as linear scratches and abrasions on specular, reflective and metallic surfaces.

Another object of the present invention is to provide an optical surface measurement system that can produce accurate and meaningful data capable of producing a 3D surface reconstruction of the object surface.

Still another object of the present invention is to provide a 3D surface measurement system that is easy to operate and can be readily set-up in the field and be adaptable to measure a wide variety of object surfaces of various dimensions.

Briefly, these and other objects of the present invention are accomplished by a hybrid active stereo 3D reconstruction-deflectometry system combining methodologies of active stereo 3D reconstruction illumination and deflectometry to provide accurate 3D surface measurements of an object under inspection. In a preferred embodiment, the present system comprises a calibrated digital camera pair and a first digital projector for active stereo 3D metrology positioned a selected distance apart on the same horizontal plane facing the inspection object at an optimal incidence angle relative to the object surface. A secondary digital projector for deflectometry is directed to project a sequence of digital patterns across the optical projection path of the first digital projector and onto a deflection screen extended between the digital camera and the inspection object at a selected angle relative thereto, the selected angle being chosen so that that the pattern projected onto the deflection screen by the secondary digital projector reflects from the surface of the inspection object towards the digital camera pair. Calibrated active stereo 3D is used to derive global shape and the uncalibrated nonplanar deflectometry acquires information of local fine deformations and surface imperfections along the object surface. The calibrated cameras allow per pixel correlations to be defined between the separate acquisition methods and produces accurate absolute measurements of both shape and local features of specular, glossy, metallic curved surfaces.

In alternate preferred embodiments, variations of the present hybrid active stereo 3D reconstruction-deflectometry system include repositioning of the secondary digital projector in one case, forward and parallel to the first digital projector with use of an optical path folding mirror to direct the projected light onto the deflection screen, and in another case, behind the nonplanar deflection screen to shine the patterned light therethrough for deflectometry. In further variations of the present system, a single digital projector is employed for both active stereo 3D reconstruction and deflectometry, with either a curved mirror or an active pivoting mirror being used to stretch or redirect the projected structured light onto the deflection screen for deflectometry.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DESCRIPTION OF THE INVENTION

The following serves to describe a preferred embodiment and alternative variations of the present invention and the best presently contemplated mode of its production and practice. This description is further made for the purpose of illustrating the general principles of the invention but should not be taken in a limiting sense, the scope of the invention being best determined by reference to any associated claims.

Figure 1:
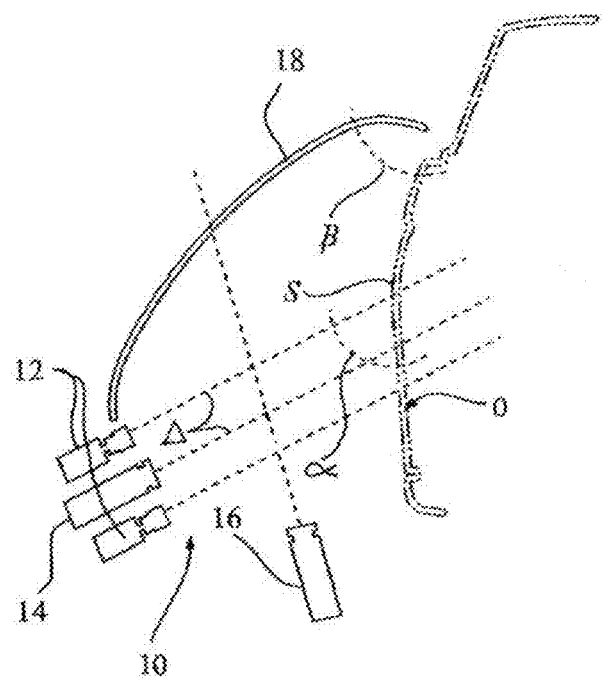
FIG. 1 is a schematic illustration of a preferred embodiment of a hybrid active stereo 3D reconstruction-deflectometry system arranged for operational use according to the present invention to provide 3D surface measurements of an object under inspection.

Referring to the drawings, the following is a list of component elements of the present hybrid active stereo 3D construction-deflectometry system, generally designated 10 in FIG. 1 and in further variations as 20, 30, 40, 50 and 60 in FIGS. 2, 3, 4, 5 and 6, respectively, and those associated components employed in connection with the present invention:

10 hybrid active stereo 3D construction-deflectometry system;
12 digital camera stereo pair;
14 first digital projector (for active stereo 3D reconstruction);
16 second digital projector (for deflectometry);
18 nonplanar deflection screen;
O object under inspection;
S object surface;
α incidence angle of active stereo 3D reconstruction to object surface;
β angle of deflection screen to object surface;
Δ disparity between optical paths;
20 first alternative variation of present hybrid system;
22 digital camera stereo pair;
24 first digital projector for active stereo 3D reconstruction;
26 second digital projector for deflectometry;
27 optical path folding mirror;
28 nonplanar deflection screen;
30 second alternative variation of present hybrid system;
32 digital camera stereo pair;
34 digital projector;
35 curved mirror;
38 nonplanar deflection screen;
40 third alternative variation of present hybrid system;
42 digital camera stereo pair;
44 digital projector;
45 pivoting mirror;
48 nonplanar deflection screen;
50 fourth alternative variation of present hybrid system;
52 digital camera stereo pair;
54 first digital projector for active stereo 3D reconstruction;
56 second digital projector for deflectometry;
58 nonplanar deflection screen;
60 fifth alternative variation of present hybrid system;
62 first digital camera stereo pair;
63 second digital camera stereo pair;
64 first digital projector for active stereo 3D reconstruction;
65 second digital projector for active stereo 3D reconstruction;
66 first digital projector for deflectometry;
68 nonplanar deflection screen; and
69 second digital projector for deflectometry.

Referring initially to FIG. 1, the present hybrid active stereo 3D reconstruction-deflectometry system 10 is shown in a preferred arrangement for operational use relative to an inspection object O to examine the object surface S and provide 3D measurements thereof. In accordance with the present invention, the present hybrid system 10 combines optical scanning methodologies of active stereo 3D reconstruction and deflectometry and comprises a digital camera stereo pair 12, a first digital projector for active stereo 3D reconstruction 14, a secondary digital projector for deflectometry 16 and a nonplanar deflection screen 18 employed in connection therewith. The digital camera stereo pair 12 and first digital projector 14 for active stereo 3D reconstruction are disposed facing the inspection object O on the same horizontal plane with their respective optical paths set substantially in parallel with a disparity Δ between them and directed at the object surface S with optimal incidence angle α. The secondary digital projector 16 for deflectometry is directed to project a pattern of active stereo 3D reconstruction transverse to the optical paths of the first digital projector 14 and digital camera pair 12 and onto the deflection screen 18. The nonplanar deflection screen 18 is extended between the digital camera stereo pair 12 and the inspection object O and disposed at a selected angle β relative to the object surface S, the selected angle being determined so that any pattern projected onto the deflection screen from the secondary digital projector 16 will reflect from the object surface S towards the digital camera pair.

The disparity Δ measure is optimally about ⅓ of the distance from the digital camera stereo pair 12 to the inspection object O. The angular variables α and β are heavily dependent on the curvature of the inspection object O and the complexity of the object surface S. In practice, both α and β can vary from 15° to 40° in various combinations.

Suitable for use as the digital camera stereo pair 12 of the present hybrid system 10 is a black & white Point Grey Model GS3-U3-51S5M-C machine vision camera with a ⅔" Sony Pregius global shutter CMOS sensor to produce high quality undistorted images. For the digital projector 14 for active stereo 3D reconstruction, a suitable unit for use is an Optima Model ML750 compact ultra-wide angle DLP projector capable of providing large, high contrast pattern projections at short distances. A suitable secondary digital projector 16 for the deflectometry aspect of the present hybrid system 10 is an Optoma Model W320UST ultra-wide angle DLP projector for its very short projection distance and 4000 lumens brightness necessary to achieve high contrast reflection on the inspection object O.

Figure 7:
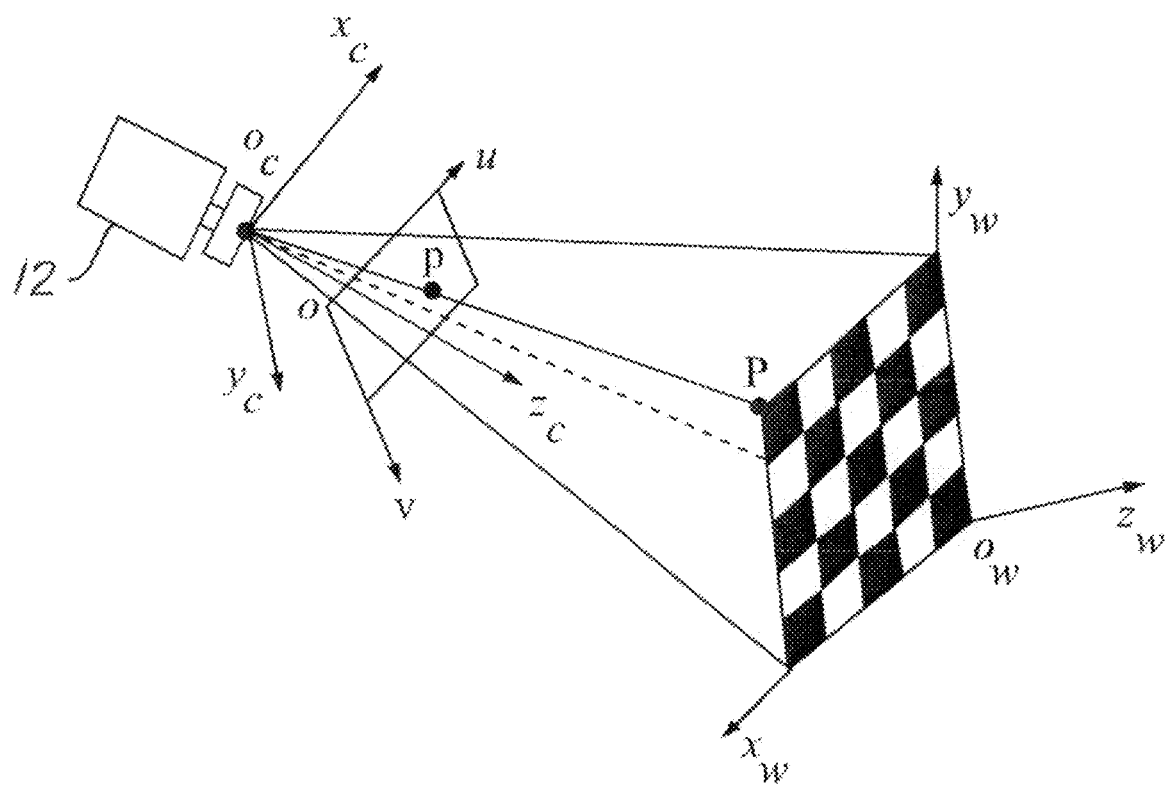
FIG. 7 is graphical representation of a planar calibration board with a checker pattern projection used to calibrate the digital camera and projector components of the present hybrid active stereo 3D construction-deflectometry system.

Referring to FIG. 7 in conjunction with FIG. 1, the digital camera stereo pair 12 and digital projector 12 for active stereo 3D reconstruction are calibrated by means of a planar calibration board containing a calibration pattern. Calibration provides both intrinsic camera and projector information as well as extrinsic information like distance between them and relative orientation. To obtain an absolute 3D reconstruction of the object surface S, the calibrated digital light projector 14 projects multi-scale random patterns onto the object surface. The digital camera stereo pair 12 captures projected images, distorted by the inspection object O. Image sequence is processed using the calibration of the digital camera stereo pair 12 and the first digital projector 14 to compute a subpixel resolution depth map. To obtain local surface deformations on the inspection object O, the digital deflectometry projector 16 projects combinations of checker, stripe and fringe pattern sequences onto deflector screen 18. Patterns are reflected by the inspection object O and captured by the digital camera stereo pair 12. The nonplanar deflection screen 18 is used to obtain pattern reflections from the curved object surfaces S. For optimization of best reflection, the deflection screen 18 may vary in its curvature dependent on the size of the object O and configuration of the object surface S.

Figure 8:
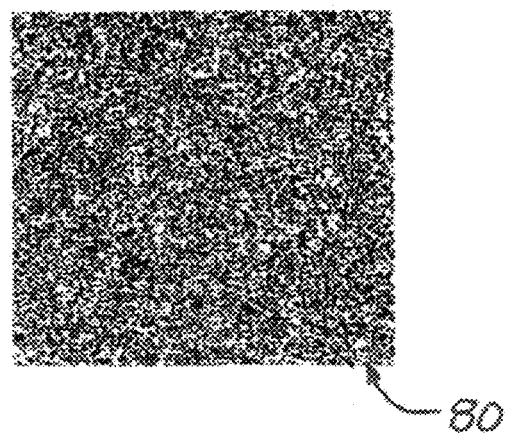
FIG. 8 is an image of a random pattern projected onto the object surface under inspection in accordance with the operation of the present invention system.
Figure 9:
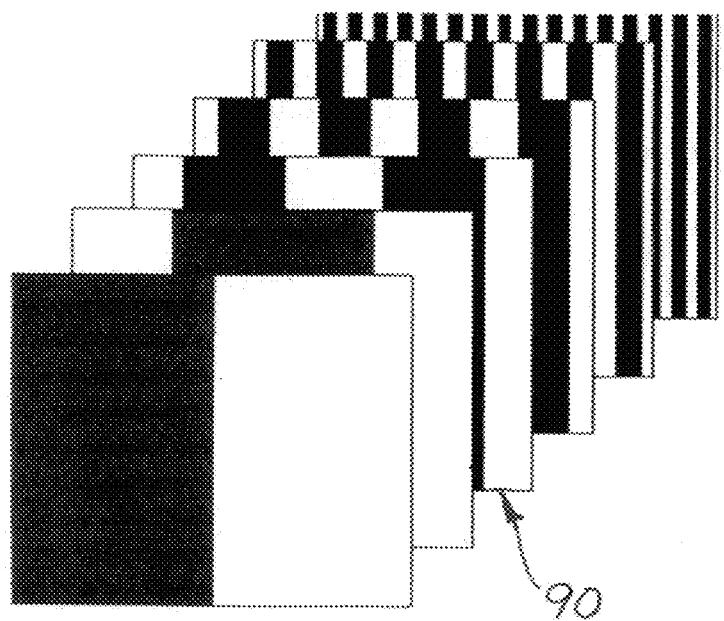
FIG. 9 is a sequence of gray code patterns projected onto the object surface under inspection in accordance with the operation of the present invention system.
Figure 10:
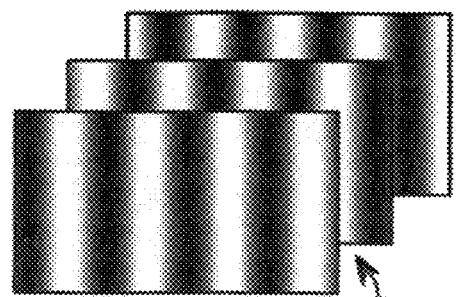
FIG. 10 is a sequence of sinusoidal fringe patterns projected onto the object surface under inspection in accordance with the operation of the present invention system.

Referring more particularly to FIGS. 8-17, to obtain the absolute 3D reconstruction necessary to extract measurements of the object surface S, the digital projector 14 for active stereo 3D reconstruction projects a multi-scale random noise pattern 80 shown in FIG. 8. Digital camera stereo pair 12 captures the projected images distorted by the inspection object O and its surface S.

Before measurements are performed, local fine deformations, dents and surface imperfections have to be detected in images and isolated and labeled for measurement. In accordance with the present invention, deflectometry is used for detection and isolation of surface imperfections and dents. Multiple sequences of patterns are projected by deflectometry projector 16 on or through deflection screen 18 and their distorted reflection on the inspection object O is observed and captured by the digital camera stereo pair 12.

Figure 11:
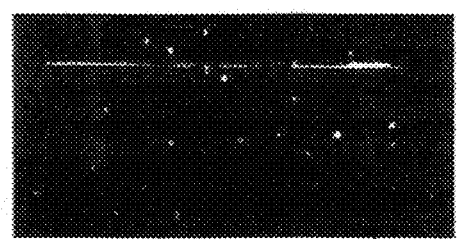
FIG. 11 is a map image of signal peaks generated in accordance with the present invention to identify dents or local deformations on the object surface.
Figure 12:
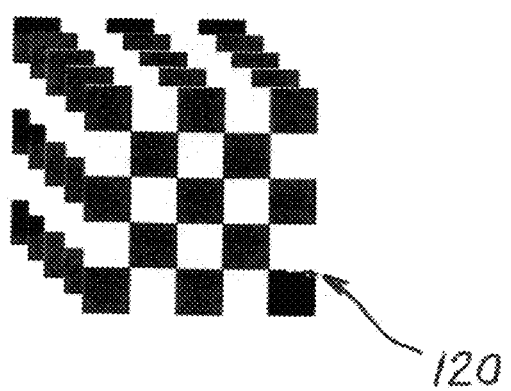
FIG. 12 is a sample image of a black and white checker pattern used in a projection sequence according to the present invention to eliminate false readings of dents or local deformations on the object surface.

First projected sequence is the Gray code pattern 90 and sinusoidal fringe patterns 100. These sequences are processed to obtain the phase map. The phase map does not directly correlate with shape, but rather with surface orientation towards the deflection screen 18, and local deformations and dents show as a very strong signal in the phase map. These local signals in the phase map are isolated by image filtering and thresholding to obtain a map of signal peaks 110 shown in FIG. 11, representing what are likely dents or local deformations on the object surface S under inspection.

Computed signal peaks 110 could represent intrinsic features of inspection object O that do not represent features of interest. They could be screws and screw holes, stickers, fixtures etc. To eliminate false positives, an additional projected pattern sequence is employed. This sequence is based on a black and white checker pattern 120, shown in FIG. 12, which is shifted by a few pixels in horizontal and vertical orientation for each image capture.

Figure 13:
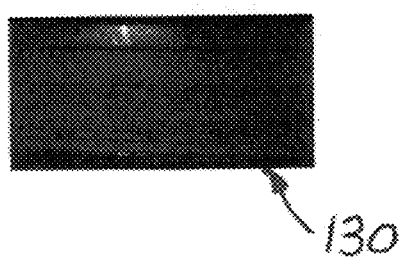
FIG. 13 is a sample image of a global illumination mask generated using the present hybrid system.
Figure 14:
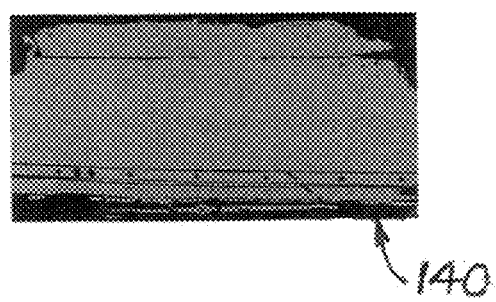
FIG. 14 is a sample image of a deflection mask generated using the present inventive system.

Combining captured images and computing intensity minimums and maximums allows generation of a global illumination mask 130 shown in FIG. 13 that represents brightness of pixels independent from deflected illumination. Further computed for generation is a deflection mask 140 shown in FIG. 14 that is indicative of the pixels that do not vary above a certain threshold during the projection sequence of the black and white checker pattern 120, the deflection representing areas of low reflectivity, like holes or fixtures or other features that are not of interest and therefore could be eliminated by the computed deflection mask. Combining the deflection mask 160 with the signal peaks map 110 yields as a result, a detected set of labeled features that are considered warranted for measurement, with all available information about the object surface S and features being combined to rule out false positives.

Figure 15:
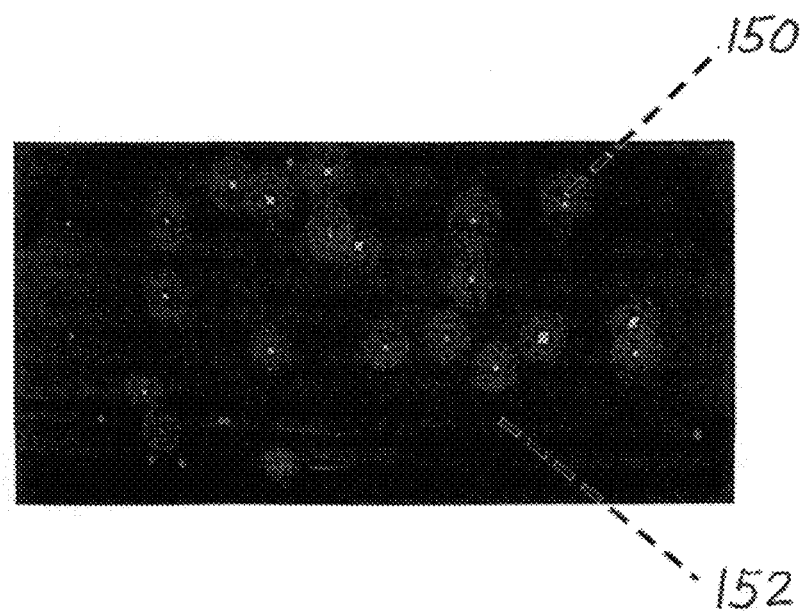
FIG. 15 is a sample image of a combined mapping template generated in accordance with the present invention to perform actual measurements of identified features of interest on the object surface.
Figure 16:
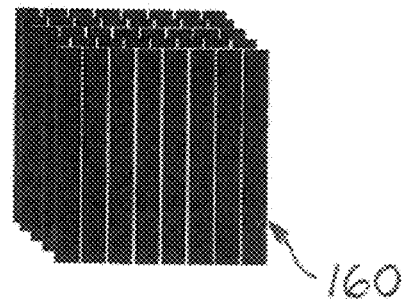
FIG. 16 is a sample image of a slit pattern used in a projection sequence according to the present invention to determine sizing of the identified features of interest for measurement.
Figure 17:
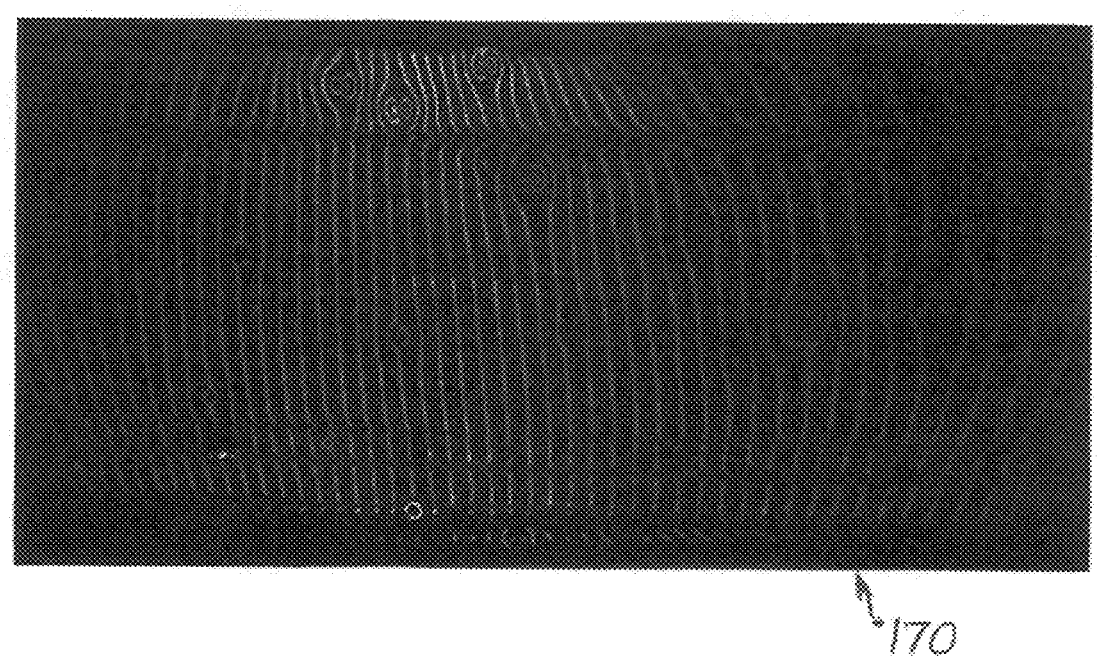
FIG. 17 is a sample live image produced in accordance with the present invention showing size and location of deformations and other features of interest on the object surface.

In completing actual measurements of detected features and dents, a fit template 170 shown in FIG. 15 may be generated with predetermined specific sizes of dents and deformations and used to perform absolute measurements matching dents and deformations to the template. First, the fit template 170 is aligned to the identified dents and deformation features using computed depth map and the filtered signal peak map 130 to obtain a correct template location and orientation map 180. To define the best fit of the actual dent size to the template, a further pattern sequence in the form of a slit pattern 160 is projected by deflectometry digital projector 16 on or through deflection screen 18. The reflected slit pattern 160 is deformed by local surface features and dents on inspection object O and produces images live as seen in FIG. 17 showing size and location of dents and deformations and other features of interest on the object surface S. Sequences of shifted slit patterns 160 are combined and processed using algorithms like generalized Hough transform or gradient map voting to find closest maximum match to the template map. Once the match to the template is computed, output form is generated with feature count and templated sizes of detected damage and localized deformations recorded and measured.

Figure 2:
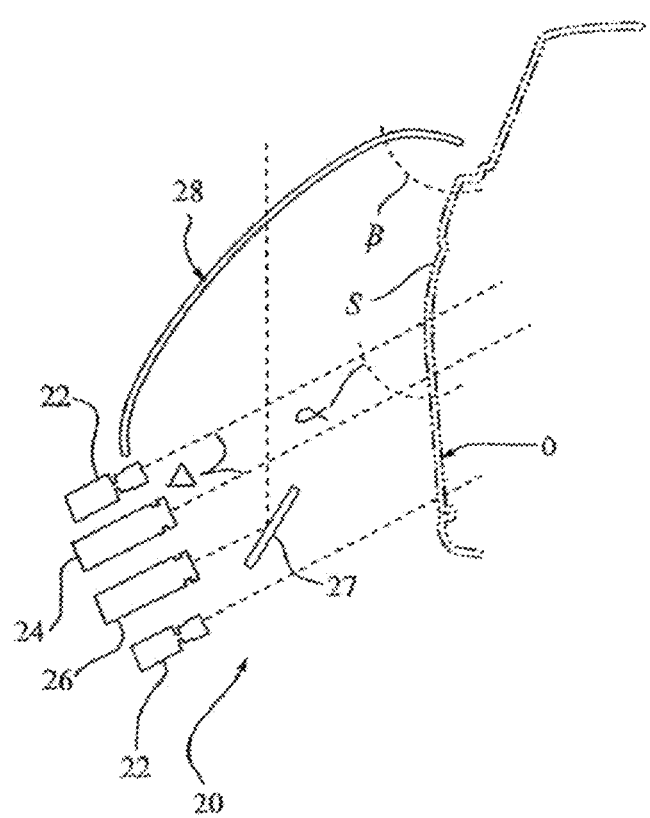
FIG. 2 is a schematic illustration of a first alternative variation of preferred embodiment of the hybrid active stereo 3D construction-deflectometry system in accordance with the present invention.

Referring now to FIG. 2, a variation of the hybrid active stereo 3D reconstruction-deflectometry system, here designated as 20, is arranged with a modified setup to the system 10 presented in FIG. 1 wherein the secondary digital projector 26 for deflectometry is positioned in between and below of the digital camera stereo pair 22 and the digital projector 24 for active stereo 3D reconstruction and a nonplanar optical path folding mirror 27 is positioned to deflect and redirect the path of the active stereo 3D reconstruction from the secondary projector onto the deflector screen 28. This arrangement allows more compact and practical setup as well as potential for larger measurement volume due to the folded optical path. The nonplanar optical path folding mirror 27 may also simplify processing and reduce computation complexity and time of the deflectometry phase map. In that case, the nonplanar mirror 27 has a shape negatively matching the shape of deflection screen 28 and is distorting projected patterns to obtain undistorted reflections from the object surface S.

Figure 3:
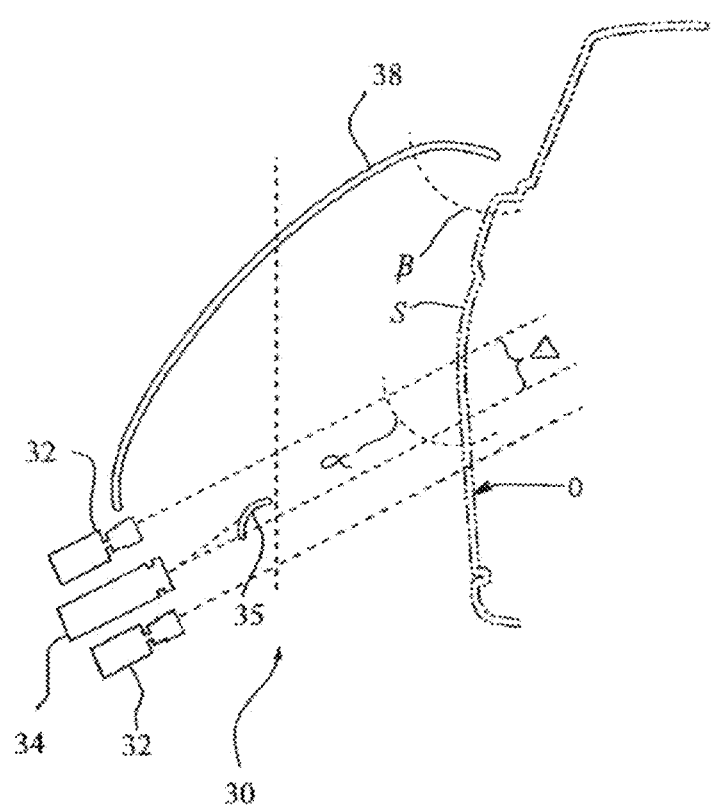
FIG. 3 is a schematic illustration of a second alternative variation of preferred embodiment of the present hybrid active stereo 3D construction-deflectometry system.
Figure 4:
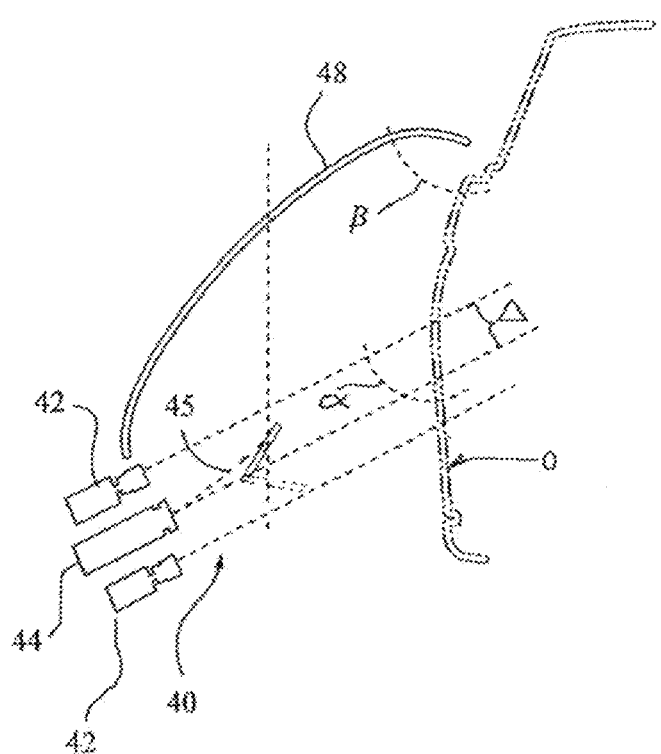
FIG. 4 is a schematic illustration of a third alternative variation of preferred embodiment of the hybrid active stereo 3D construction-deflectometry system in accordance with the present invention.

Referring now to FIGS. 3 and 4, further variations of the present hybrid system may be arranged using only a single digital projector for both active stereo 3D reconstruction and deflectometry methodologies. In FIG. 3, the hybrid system 30 has only one digital projector 34 that is used for both active stereo 3D reconstruction and deflectometry. Part of the active stereo 3D reconstruction projection from digital projector 34 is deflected by a curved mirror 35 positioned in its optical path and acts like an anamorphic lens stretching the projected image in one direction to cover the deflector screen 38. In FIG. 4, the hybrid system 40 has a single digital projector 44 used for both active stereo 3D reconstruction and deflectometry techniques and employs an active pivoting mirror 45 in the optical path of the digital projector that is able to redirect the structured light for deflectometry and rotate out of the projector field of view to direct the active stereo 3D reconstruction light projection onto the object surface S. It should be noted and understood that the single digital projector variations of the present hybrid system in both FIGS. 3 and 4 are useful to simplify the spatial arrangement of the system and make for a more compact setup. In either case, the optical pass splitting mirror 35 or active pivoting optical pass folding mirror 45 are used to redirect the projector image towards and onto the respective deflector screens 38 and 48.

Figure 5:
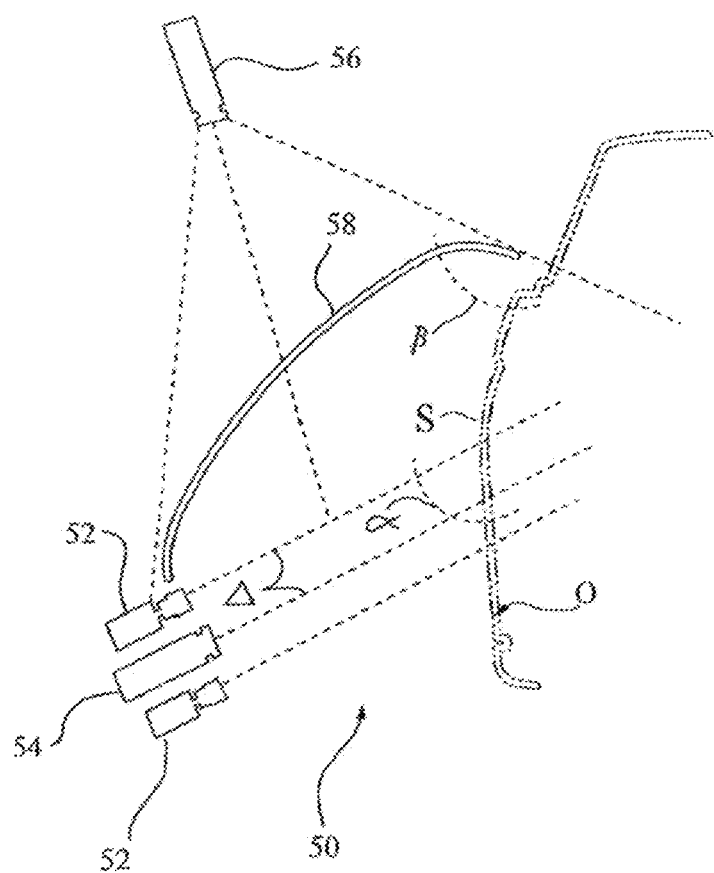
FIG. 5 is a schematic illustration of a fourth alternative variation of preferred embodiment of the present hybrid active stereo 3D construction-deflectometry system.

Referring now to FIG. 5, another preferred variation of the hybrid active stereo 3D reconstruction—deflectometry system 50 utilizes back projection deflectometry screens 58 with a deflectometry digital projector 56 being positioned behind the screen in order to shine projected patterns therethrough. This setup prevents adverse illumination effects on the re digital stereo camera pair 52 and also minimizes setup size.

Figure 6:
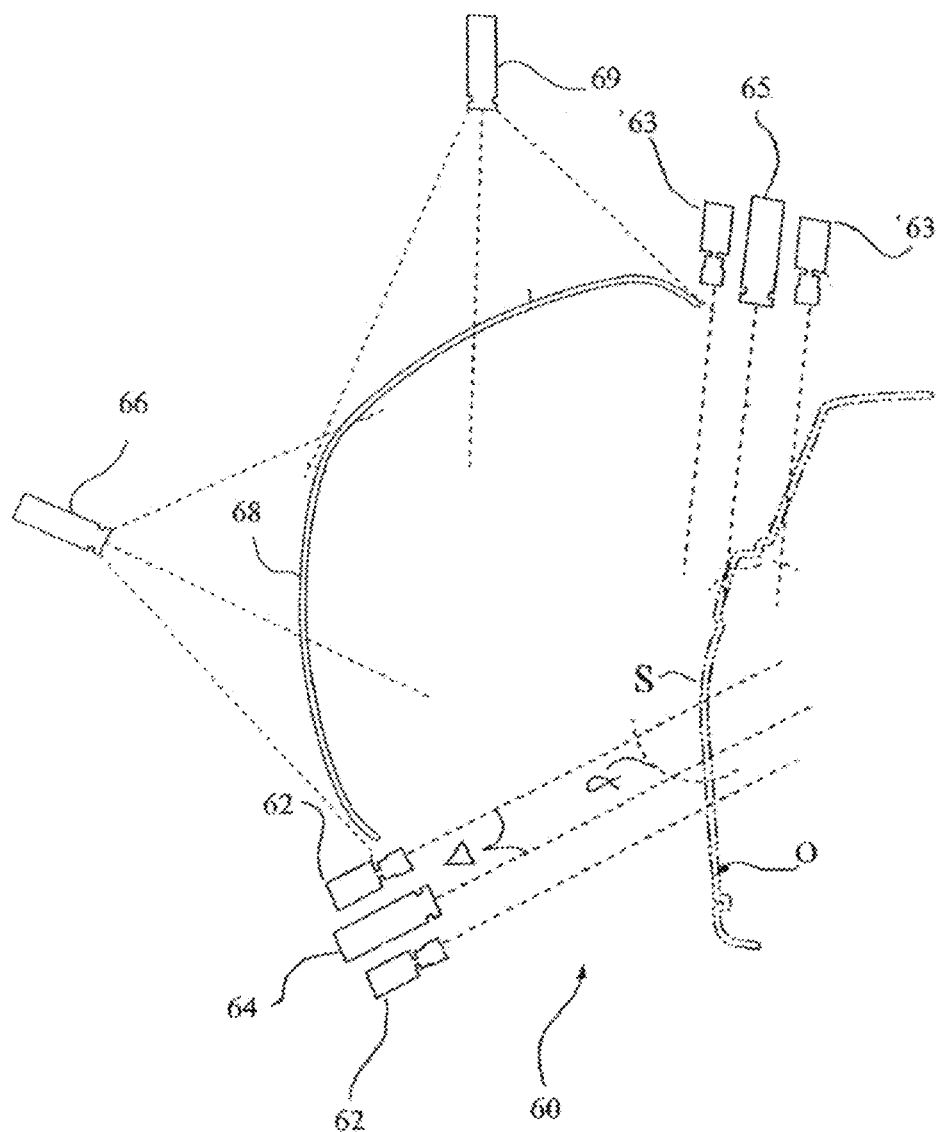
FIG. 6 is a schematic illustration of a fifth alternative variation of preferred embodiment of the present hybrid active stereo 3D construction-deflectometry system.

Referring now to FIG. 6, a further preferred variation of the hybrid active stereo 3D reconstruction—deflectometry system 60 is shown having a multiple number of system configurations similar to that above described variation system 50. The combination of multiple digital camera stereo pairs 62 and 63, as well as deflectometry projectors 66 and 69, allows for deployment of a much larger deflection screen 68 and increases the capability of measuring larger and more complex shapes. In this variation, multi-scale random pattern 80 while projected on inspection object O, is also used to calibrate multiple stereo camera pairs extrinsic, as well as re-calibrate intrinsic parameters, if needed, using bundle adjustment methods, therefore allowing for more robust and self-correcting system for scanning complete vehicles and/or large parts.

Therefore, it is apparent that the described invention provides an improved optical scanning system for providing 3D surface measurements of objects of varying size and dimension that are more accurate and reliable in their measure than heretofore provided by the prior art systems. More particularly, the described hybrid active stereo 3D reconstruction-deflectometry combines the methodologies of active stereo 3D reconstruction and deflectometry to provide an improved 3D surface measurement system capable of accurately measuring the surfaces of objects large and small and particularly capable of acquiring and measuring both global shape and local fine deformations, dents and surface imperfections of specular, glossy and metallic surfaces of various industrial, automotive and aerospace components and parts. The disclosed invention further provides a 3D optical scanning system capable of detecting and measuring both circular and semicircular dents across large nonplanar surfaces as well as linear scratches and abrasions on specular, reflective and metallic surfaces. Use of the present inventive system generates accurate and meaningful data capable of generating a 3D surface reconstruction of the object surface that will identify a variety and range of impact damages that may have resulted from hail storms, gravel impact or similar and allow determination of the estimated cost of repairing the damages. The present hybrid active stereo 3D reconstruction-deflectometry system is easy to operate, can be readily set-up in the field and is able to measure a wide variety of object surfaces of differing dimensions.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Furthermore, certain modifications to the described embodiment that serve to benefit its usage are within the scope of the present invention. Accordingly, it is understood that this invention is not limited to the particular embodiment described, but rather is intended to cover modifications within the spirit and scope of the present invention as expressed in any appended claims.

What is claimed is:

1. An optical scanning system for acquiring three-dimensional (3D) measurements of an object surface, the optical scanning system comprising:
    a first digital illuminator configured to illuminate a sequence of first patterns along a first optical path onto the object surface;
    a second digital illuminator configured to illuminate at least one sequence of second patterns along a second optical path onto the object surface, the second optical path being different from the first optical path, the at least one sequence of second patterns being different from the sequence of first patterns; and
    at least one digital camera disposed facing the object surface and configured to capture both images of the sequence of first patterns reflected from the object surface and images of the at least one sequence of second patterns reflected from the object surface to generate 3D reconstruction data of the object surface.

2. The optical scanning system of claim 1, wherein the first digital illuminator and the at least one digital camera are configured together for an active stereo 3D reconstruction measurement of the object surface, and
    wherein the second digital illuminator and the at least one digital camera are configured together for a deflectometry measurement of the object surface.

3. The optical scanning system of claim 1, wherein the at least one digital camera comprises an area-scan camera.

4. The optical scanning system of claim 1, wherein at least one of the first digital illuminator or the second digital illuminator comprises a digital projector configured to provide pattern projections.

5. The optical scanning system of claim 1, wherein at least one of the first digital illuminator or the second digital illuminator is configured to illuminate light in a visible wavelength range.

6. The optical scanning system of claim 1, wherein the sequence of first patterns comprise a sequence of multi-scale random patterns, and
    wherein the at least one sequence of second patterns comprises at least one of:
        a first sequence including at least one of gray code patterns or sinusoidal fringe patterns,
        a second sequence including a series of checker patterns, or
        a third sequence including a sequence of slit patterns.

7. The optical scanning system of claim 1, wherein the at least one digital camera and the first digital illuminator are calibrated together using a calibration pattern, and
    wherein the at least one sequence of second patterns is non-calibrated.

8. The optical scanning system of claim 1, wherein the sequence of first patterns are illuminated along the first optical path on the object surface at a first incident angle,
    wherein the at least one sequence of second patterns are illuminated along the second optical path on the object surface at a second incident angle, and
    wherein the second optical path is angled with respect to the first optical path.

9. The optical scanning system of claim 8, wherein at least one of the first incident angle or the second incident angle is determined based on a curvature of the object surface,
    wherein at least one of the first incident angle or the second incident angle is in a range from 15° to 40°, and
    wherein the at least one digital camera is disposed in a direction substantially parallel to the first optical path.

10. The optical scanning system of claim 1, wherein the second digital illuminator comprises a screen positioned in the second optical path for illumination including the at least one sequence of second patterns onto the object surface.

11. The optical scanning system of claim 10, wherein the second digital illuminator further comprises a digital projector positioned to project the illumination including the at least one sequence of second patterns onto the screen so that the at least one sequence of second patterns is deflected by the screen onto the object surface.

12. The optical scanning system of claim 10, wherein the second digital illuminator further comprises a digital projector positioned behind the screen so that the at least one sequence of second patterns is projected through the screen onto the object surface.

13. The optical scanning system of claim 10, further comprising:
an optical path folding mirror positioned along the second optical path configured to redirect the illumination including the at least one sequence of second patterns onto the screen to rectify deflections of the illumination including the at least one sequence of second patterns onto the object surface.

14. The optical scanning system of claim 10, wherein the screen is nonplanar.

15. The optical scanning system of claim 1, wherein the at least one digital camera comprises a pair of cameras disposed on opposite sides of the first digital illuminator, and
wherein each camera of the pair of cameras is directed along a respective optical path that is parallel to the first optical path and spaced from the first optical path by a distance that is about one third of a distance from the pair of cameras to the object surface.

16. The optical scanning system of claim 1, wherein the at least one digital camera comprises a plurality of digital cameras arranged to face the object surface from different directions, and
wherein each of the plurality of digital cameras is configured to measure a corresponding area of the object surface along a respective optical path corresponding to a respective direction of the different directions.

17. The optical scanning system of claim 16, comprising:
a plurality of first digital illuminators associated with the plurality of digital cameras and arranged to face the object surface from the different directions, the plurality of first digital illuminators comprising the first digital illuminator; and
a plurality of second digital illuminators associated with the plurality of digital cameras and arranged to face the object surface from separate directions, the plurality of second digital illuminators comprising the second digital illuminator,
wherein each of the plurality of digital cameras is configured to capture both images of a sequence of first patterns from a corresponding first digital illuminator reflected from the object surface and images of at least one sequence of second patterns from a corresponding second digital illuminator reflected from the object surface to generate three-dimensional (3D) reconstruction data of the corresponding area of the object surface.

18. The optical scanning system of claim 17, wherein each of the plurality of second digital illuminators comprises a respective digital projector configured to project at least one corresponding sequence of second patterns along a respective second optical path onto the object surface, the respective second optical paths being associated with the corresponding areas of the object surface, and
wherein the optical scanning system further comprises:
a screen positioned in the respective second optical paths and angled with respect to the object surface to deflect the corresponding sequences of second patterns from the respective digital projectors of the plurality of second digital illuminators onto the corresponding areas of the object surface,
wherein the plurality of digital cameras are configured to capture the images of the corresponding sequences of second patterns deflected by the screen and reflected from the object surface.

19. The optical scanning system of claim 1, further comprising a computing device coupled to the at least one digital camera and configured to:
process the captured images of the sequence of first patterns reflected from the object surface to provide measurements of a global shape of the object surface, and
process the captured images of the at least one sequence of second patterns reflected from the object surface to provide measurements of at least one of local deformations, dents, or surface imperfections of the object surface.

20. An optical scanning system for acquiring three-dimensional (3D) measurements of an object surface, the optical scanning system comprising:
a plurality of digital illuminators arranged to face the object surface from different directions, wherein each of the plurality of digital illuminators is configured to illuminate the object surface with at least one sequence of patterns along a respective optical path associated with a corresponding direction of the different directions; and
a plurality of digital cameras arranged to face the object surface from separate directions and configured to measure corresponding areas of the object surface from the separate directions,
wherein each of the plurality of digital cameras is configured to capture images of at least two different sequences of patterns from at least one corresponding digital illuminator of the plurality of digital illuminators reflected from the object surface to generate 3D reconstruction data of a corresponding area of the object surface.

21. The optical scanning system of claim 20, wherein the plurality of digital illuminators comprise:
for each of the plurality of digital cameras,
a corresponding first digital illuminator configured to illuminate a sequence of first patterns along a first optical path onto the object surface; and
a corresponding second digital illuminator configured to illuminate at least one sequence of second patterns along a second optical path onto the object surface, the second optical path being different from the first optical path, the at least one sequence of second patterns being different from the sequence of first patterns,
wherein the digital camera is configured to capture both images of the sequence of first patterns reflected from the object surface and images of the at least one sequence of second patterns reflected from the object surface to generate the 3D reconstruction data of the corresponding area of the object surface.

22. The optical scanning system of claim 21, further comprising a screen comprising different portions corresponding to the corresponding areas of the object surface,
wherein the screen is configured such that, for each of the plurality of digital cameras, a different corresponding portion of the screen is positioned in the second optical path for the corresponding second digital illuminator to deflect at least one corresponding sequence of second patterns onto the corresponding area of the object surface, and the digital camera is configured to capture images of the at least one corresponding sequence of second patterns deflected by the different corresponding portion of the screen and reflected from the corresponding area of the object surface.

23. The optical scanning system of claim 20, comprising: for each of the plurality of digital cameras,
a corresponding digital illuminator configured to illuminate a sequence of multi-scale patterns along a direct optical path onto the object surface; and
a corresponding light path deflector disposed for selectively redirecting the sequence of multi-scale patterns from the direct optical path and along a deflection path; and
a screen angled with respect to the object surface to deflect redirected multi-scale patterns along the deflection path onto the object surface,
wherein the digital camera is disposed facing the object surface and configured to capture both images of the sequence of multi-scale patterns illuminated directly onto and reflected from the corresponding area of the object surface and images of the redirected multi-scale patterns deflected by the screen onto and reflected from the corresponding area of the object surface to generate the 3D reconstruction data of the corresponding area of the object surface.

24. The optical scanning system of claim 23, wherein the light path deflector comprises one of:
a curved optical path-splitting mirror disposed in a stationary position along the direct optical path, or
an active mirror pivotally disposed for rotation into and out of the direct optical path.

25. The optical scanning system of claim 20, wherein at least part of the optical scanning system is configured to be movable.

26. An optical scanning method of acquiring three-dimensional (3D) measurements of an object surface, the optical scanning method comprising:
illuminating a sequence of first patterns along a first optical path onto the object surface;
illuminating at least one sequence of second patterns along a second optical path onto the object surface, the second optical path being different from the first optical path, the at least one sequence of second patterns being different from the sequence of first patterns; and
capturing both images of the sequence of first patterns reflected from the object surface and images of the at least one sequence of second patterns reflected from the object surface to generate 3D reconstruction data of the object surface.

27. The optical scanning method of claim 26, wherein illuminating the at least one sequence of second patterns along the second optical path onto the object surface comprises:
illuminating the at least one sequence of second patterns onto a screen to deflect the at least one sequence of second patterns onto the object surface, the screen being positioned in the second optical path and angled with respect to the object surface.

28. The optical scanning method of claim 26, further comprising:
processing the captured reflected images of the sequence of first patterns illuminated on the object surface along the first optical path to derive a global shape of the object surface and a depth map; and
processing the captured reflected images of the sequence of second patterns illuminated on the object surface along the second optical path to generate a phase map of the object surface, wherein steep changes of phase in relation to surrounding pixels indicative of surface deformations in the phase map are marked and projected onto the depth map for indexing and measurement in an absolute scale.

29. The optical scanning method of claim 26, wherein the sequence of first patterns comprise a sequence of multi-scale random patterns.

30. The optical scanning method of claim 26, wherein the at least one sequence of second patterns comprises a first sequence of light patterns including at least one of gray code patterns or sinusoidal fringe patterns, and
wherein the optical scanning method further comprises:
generating a phase map of the object surface by processing captured reflected images of the first sequence of second patterns illuminated on the object surface; and
obtaining a map of signal peaks by isolating local peak signals caused by at least one of dents, deformations, or scratches on the object surface.

31. The optical scanning method of claim 30, wherein the at least one sequence of second patterns comprises a second sequence of light patterns including a series of checker patterns, and
wherein the optical scanning method comprises:
combining captured reflected images of the second sequence of second patterns illuminated on the object surface;
computing intensity minimums and maximums to generate a global illumination mask that represents brightness of pixels independent from reflected illumination;
generating a reflection mask based on the global illumination mask, the reflection mask being indicative of pixels representing areas having a lower reflectivity than areas including the dents, the deformations, or the scratches on the object surface; and
combining the reflection mask and the map of signal peaks to generate a detected set of labeled features for measurements of the at least one of dents, deformations, or scratches on the object surface.

32. The optical scanning method of claim 31, further comprising:
processing the captured reflected images of the sequence of first patterns illuminated on the object surface along the first optical path to derive a global shape of the object surface and a depth map;
generating a fit template with predetermined specific sizes of dents and deformations; and
aligning the fit template to the detected set of labeled features using the depth map and the global illumination mask to obtain a correct template location and orientation map.

33. The optical scanning method of claim 32, wherein the at least one sequence of second patterns comprises a third sequence of light patterns including a sequence of slit patterns,
  wherein the optical scanning method further comprises:
    capturing reflected images of the third sequence of light patterns illuminated on the object surface;
    combining the captured reflected images of the third sequence of light patterns and processing the combined reflected images to find a closest maximum match to the correct template location and orientation map; and
    generating an output form with feature counts and templated sizes of detected damage and localized deformation of the object surface based on a result of the finding of the closest maximum match.

* * * * *